(12) United States Patent
Bell

(10) Patent No.: US 9,413,147 B2
(45) Date of Patent: Aug. 9, 2016

(54) POWER LINE GRID

(71) Applicant: Dennis Lee Bell, Phillipsburg, MT (US)

(72) Inventor: Dennis Lee Bell, Phillipsburg, MT (US)

( * ) Notice: Subject to any disclaimer, the term of this patent is extended or adjusted under 35 U.S.C. 154(b) by 270 days.

(21) Appl. No.: 13/732,824

(22) Filed: Jan. 2, 2013

(65) Prior Publication Data
US 2014/0185176 A1    Jul. 3, 2014

(51) Int. Cl.
*H02G 1/02* (2006.01)
*H02H 7/22* (2006.01)
*H02H 7/26* (2006.01)
*H02G 7/04* (2006.01)

(52) U.S. Cl.
CPC . *H02G 1/02* (2013.01); *H02G 7/04* (2013.01); *H02H 7/22* (2013.01); *H02H 7/26* (2013.01)

(58) Field of Classification Search
CPC ........... H02H 7/22; H02H 7/26; H02H 7/261; H02H 7/262; H02H 7/263; H02G 7/18; H02G 1/02; H02G 7/02
USPC .............................................. 361/62–68, 115
See application file for complete search history.

(56) References Cited

U.S. PATENT DOCUMENTS

| | | | | |
|---|---|---|---|---|
| 1,942,534 A * | 1/1934 | Burghardt | ..................... | 188/82.4 |
| 3,805,054 A * | 4/1974 | Wolf | ............................... | 362/403 |
| 5,806,624 A * | 9/1998 | Nordtvedt | ........................ | 182/48 |
| 6,160,690 A * | 12/2000 | Matsumoto et al. | ............ | 361/62 |
| 6,687,110 B2 * | 2/2004 | Murray | .......................... | 361/131 |
| 7,589,640 B2 * | 9/2009 | Bell | ............................... | 340/687 |
| 2003/0128149 A1 * | 7/2003 | Miceli et al. | ..................... | 342/22 |
| 2006/0169470 A1 * | 8/2006 | Bell | .......................... | 174/40 CC |
| 2010/0212784 A1 * | 8/2010 | Hannay | .......................... | 144/371 |
| 2011/0025070 A1 * | 2/2011 | Price | ................................ | 290/55 |
| 2011/0140909 A1 * | 6/2011 | Olson et al. | .............. | 340/870.02 |

* cited by examiner

*Primary Examiner* — Stephen W Jackson
*Assistant Examiner* — Christopher Clark

(57) ABSTRACT

The present invention is directed to a power line system having a number of controlled release mechanisms. A number of utility poles with cross bars each have a controlled release mechanism attached. A number of sensors are attached to the cross bars. A communication system is electrically connected to the sensors. A sector switch is electrically connected to the communication system. When the controlled release mechanism senses too much force on one of the utility poles it lowers the cross bar in a controlled manner to the ground. A sensor detects this and the communication system sends a message to the sector switch to open. When the storm or other threat is over, the cross bars can be raised by turning the winch in the controlled release mechanism.

8 Claims, 6 Drawing Sheets

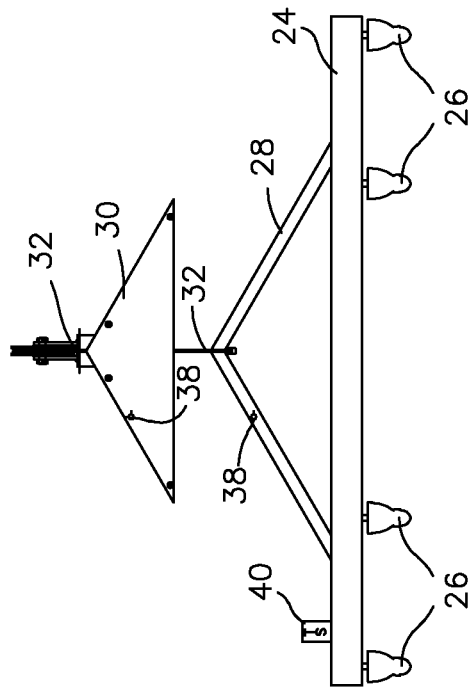
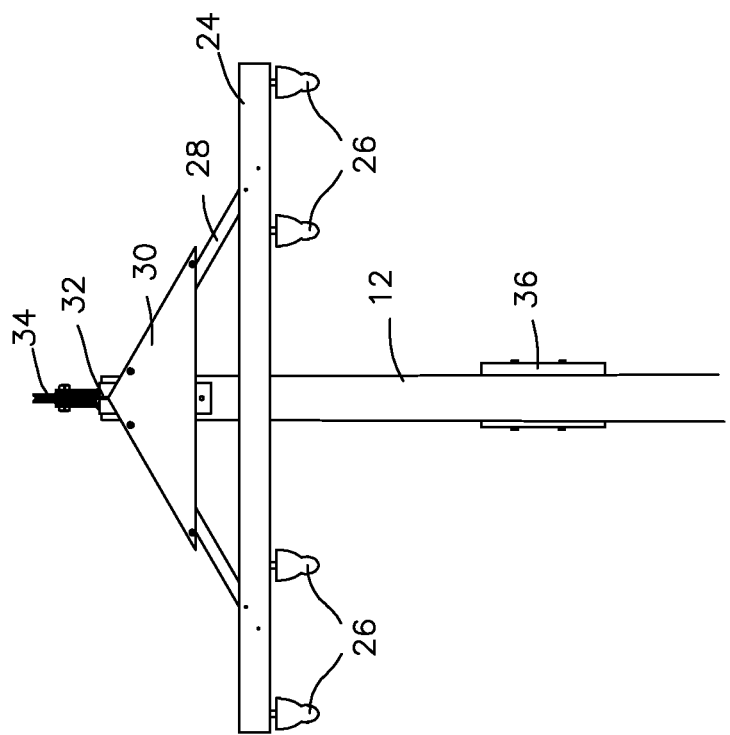

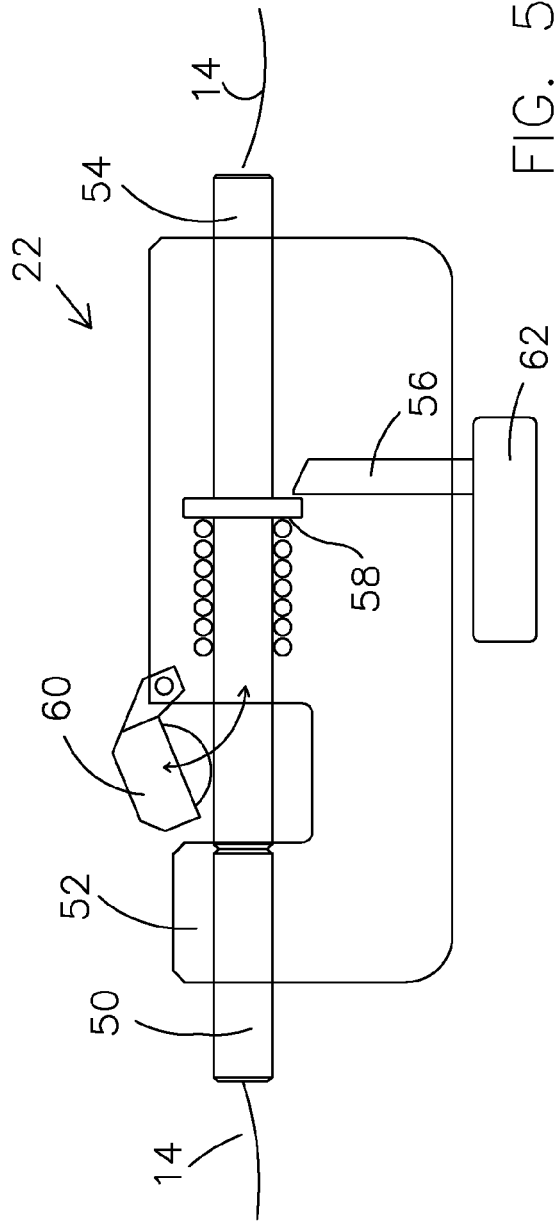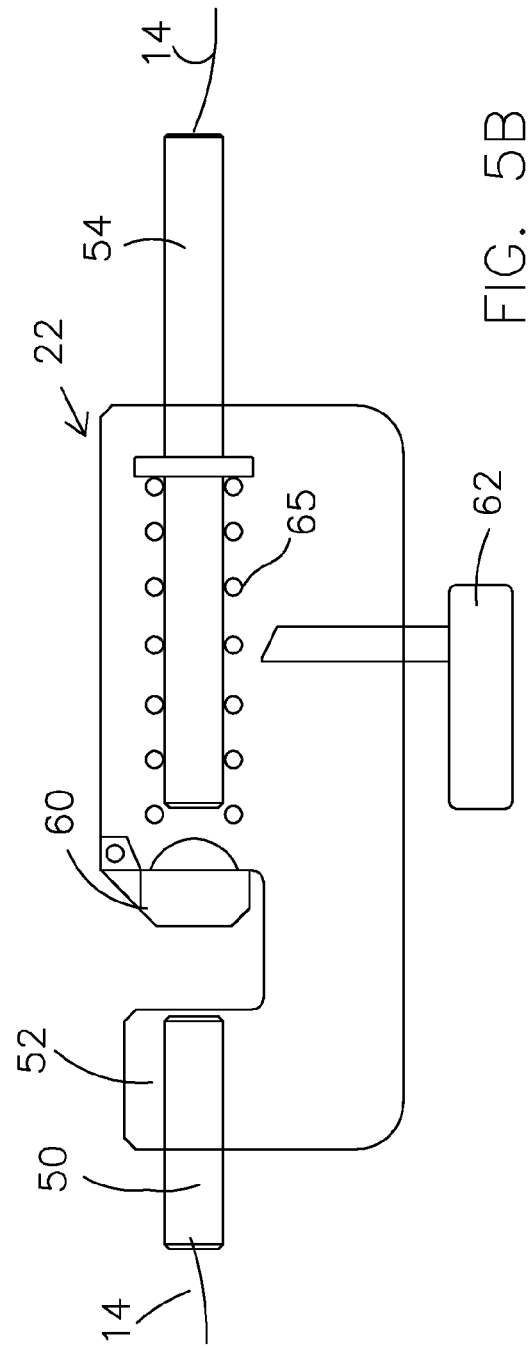

POWER LINE GRID

RELATED APPLICATIONS

The present invention claims priority on provisional patent application Ser. No. 61/583,357, filed on Jan. 5, 2012, entitled "Improved Power Line System" and is hereby incorporated by reference

STATEMENT REGARDING FEDERALLY SPONSORED RESEARCH

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING

Not Applicable

BACKGROUND OF THE INVENTION

Every year electrical utility poles are knocked down and destroyed in storms across the US and the world. Historically, thousands of miles of utility lines have been lost to adverse weather and other external forces, costing over a billion dollars a year to repair. Many consumers who depend on the utility supply have been left without service for weeks at a time, resulting in huge losses of produce, dairy and other inventory and equipment. Further, insurance companies are burdened by the large claims that result from the loss of utility services.

Present designs do not provide a means in all cases to cease the flow of power to downed conductors and transformers. Downed conductors often result in loss of life and damage or destruction of property.

Thus, what is needed is a system that monitors and responds to external stresses on utility conductors to prevent damage to these valuable conductors.

BRIEF SUMMARY OF INVENTION

These and other problems are solved by a power line system having a number of controlled release mechanisms. A number of utility poles with cross bars each have a controlled release mechanism attached. A number of sensors are attached to the cross bars. A communication system is electrically connected to the sensors. A sector switch is electrically connected to the communication system. When the controlled release mechanism senses too much force on one of the utility poles it lowers the cross bar in a controlled manner to the ground. A sensor detects this and the communication system sends a message to the sector switch to open. When the storm or other threat is over, the cross bars can be raised by turning the winch in the controlled release mechanism. This system protects electrical power lines and makes it easy to restore power after a storm or other event.

Note that the present invention is described with respect to electrical utility poles however it should be apparent to those skilled in the art that it applies equally to utility towers or any overhead electrical power line system.

BRIEF DESCRIPTION OF THE SEVERAL VIEWS OF THE DRAWINGS

FIG. 2 is a side view of a utility pole with a controlled release mechanism in accordance with on embodiment of the invention;

FIG. 3 is a is view of a mounting bracket, cable and cross bar in accordance with one embodiment of the invention;

FIG. 5A is a cross sectional view of a sector switch in a closed position in accordance with one embodiment of the invention;

FIG. 5B is a cross sectional view of a sector switch in an open position in accordance with one embodiment of the invention;

DETAILED DESCRIPTION OF THE INVENTION

The present invention is directed to a power line system having a number of controlled release mechanisms. A number of utility poles with cross bars each have a controlled release mechanism attached. A number of sensors are attached to the cross bars. A communication system is electrically connected to the sensors. A sector switch is electrically connected to the communication system. When the controlled release mechanism senses too much force on one of the utility poles it lowers the cross bar in a controlled manner to the ground. A sensor detects this and the communication system sends a message to the sector switch to open. When the storm or other threat is over, the cross bars can be raised by turning the winch in the controlled release mechanism. This system protects electrical power lines and makes it easy to restore power after a storm or other event.

Note that the present invention is described with respect to electrical utility poles however it should be apparent to those skilled in the art that it applies equally to utility towers or any overhead electrical power line system.

Figure 1:
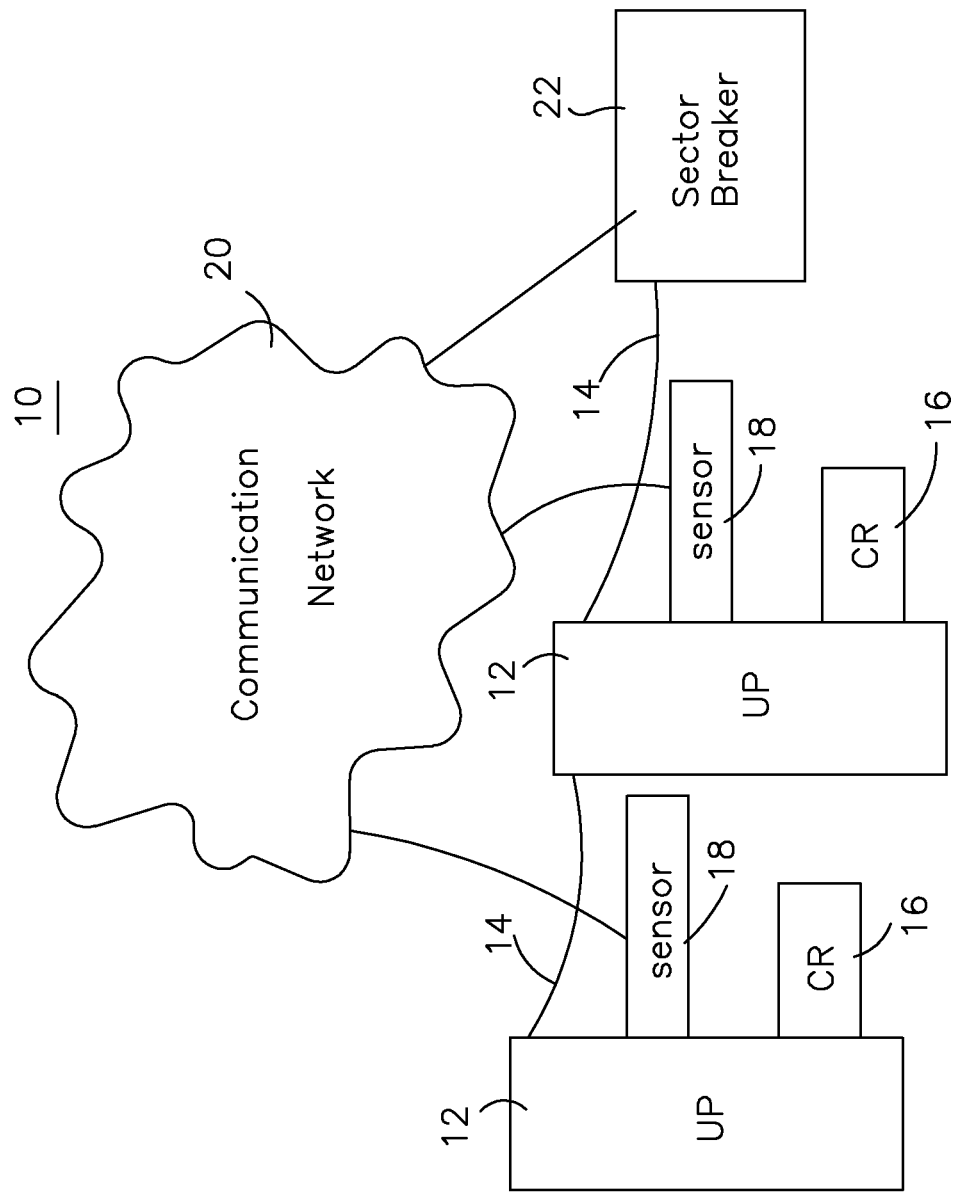
FIG. 1 is a block diagram of a power line system in accordance with one embodiment of the invention.

FIG. 1 is a block diagram of a power line system 10 in accordance with one embodiment of the invention. The system 10 has a plurality of utility poles (UP) 12 which hold one or more electrical power lines 14. Each of the utility poles 12 has a controlled release mechanism 16 and a sensor 18. The sensors 18 are connected to a communication network 20. The communication network 20 is connected to a sector switch 22, which is also connected to the electrical power line 14.

FIG. 2 is a side view of a utility pole 12 with a controlled release mechanism in accordance with on embodiment of the invention. The utility pole 12 has a cross bar 24 with a plurality of electrical insulators 26 hanging below the cross bar 24. The cross bar 24 has a dock 28 that mates with a dock yoke 30 or mounting bracket. The dock 28 is held in the dock yoke 30 by a cable 32. The cable 32 extends over a pulley 34 and terminates in centrifugal braking and winch box 36.

FIG. 3 is a is view of a mounting bracket 30, cable 32 and cross bar 24 in accordance with one embodiment of the invention. The yoke mount 30 is affixed to the utility pole 12. The cable 32 extends through the mounting bracket 30 and is attached to the yoke or dock 28. The mating bracket 28 is attached to the cross bar 24. The mounting bracket 30 and the mating bracket 28 have electrical contact points 38 that form a continuity sensor. A tilt sensor 40 is mounted on the cross bar 24.

Figure 4:
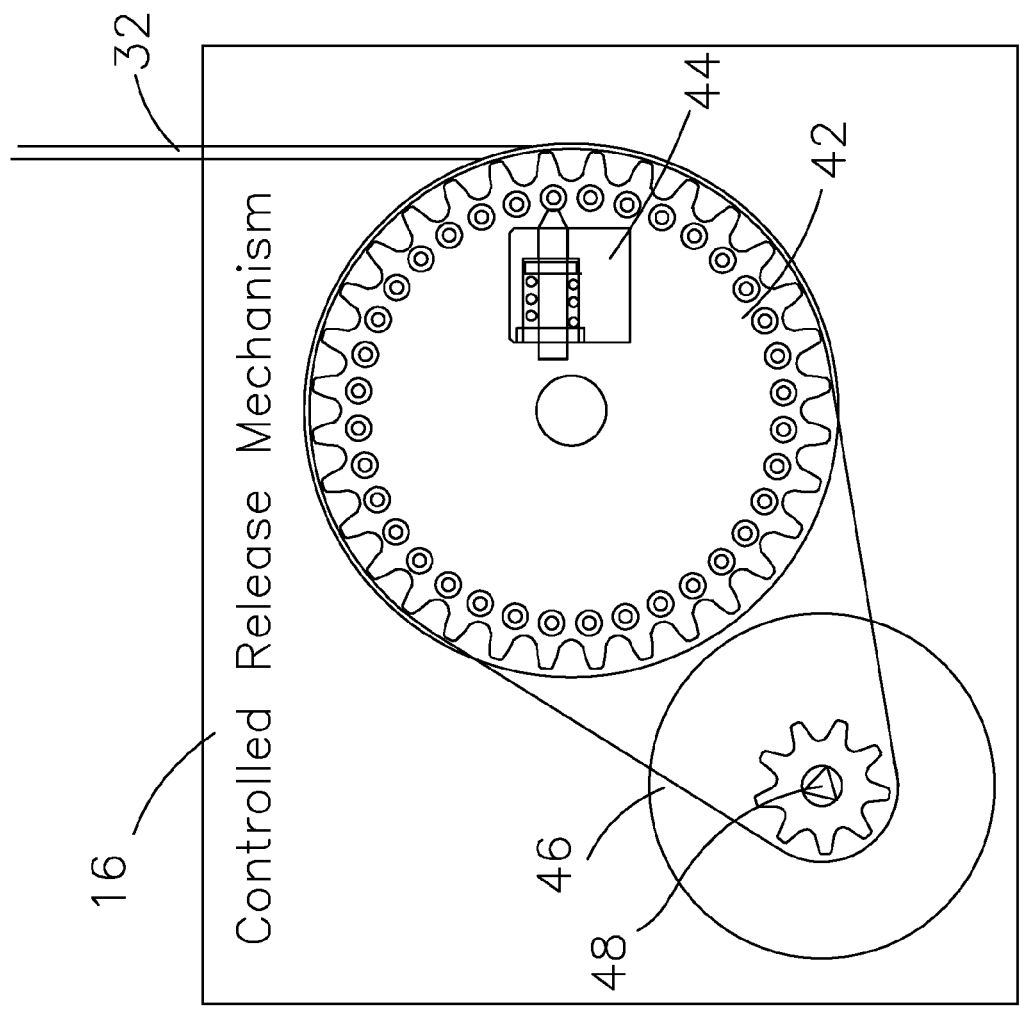
FIG. 4 is a block diagram of a controlled release mechanism in accordance with on embodiment of the invention.

FIG. 4 is a block diagram of a controlled release mechanism 16 in accordance with on embodiment of the invention. The controlled release mechanism 16 include the cable 32 connected to a winch 42 around which the cable 32 is wound. A force or shear sensor 44 holds the winch 42 in place until a threshold force is sensed. A centrifugal brake 46 is connected to the winch 42. The winch 42 may have a drive mechanism connector 48 to allow a utility worker to raise the cross bar 24. In one embodiment, the force sensor is a spring/detent plunger that engages a gear in the winch 42.

FIGS. 5A & B show a cross sectional view of a sector breaker 22 in accordance with one embodiment of the invention. In FIG. 5A the switch 22 is closed and in FIG. 5B the switch 22 is open. The switch 22 has a fixed contact 50 mounted in a housing 52, which may be made of a dielectric material. A second movable contact 54 is held in place by mechanical sear 56. The sear 56 engages a lip 58 on the moveable contact 54 when the switch 22 is closed. A spring 60 biases the switch 22 open making the sector breaker 22 a normally open switch. The controller or actuator 62 controls the position of the mechanical sear 56. A spring loaded dielectric cap 60 covers the moveable contact 54 when the switch 22 is open. Both contacts 50, 54 are connected to electrical power lines 14. In one embodiment, the contact switch 22 includes a drive mechanism to close the switch 22 once it has been opened.

Figure 6:
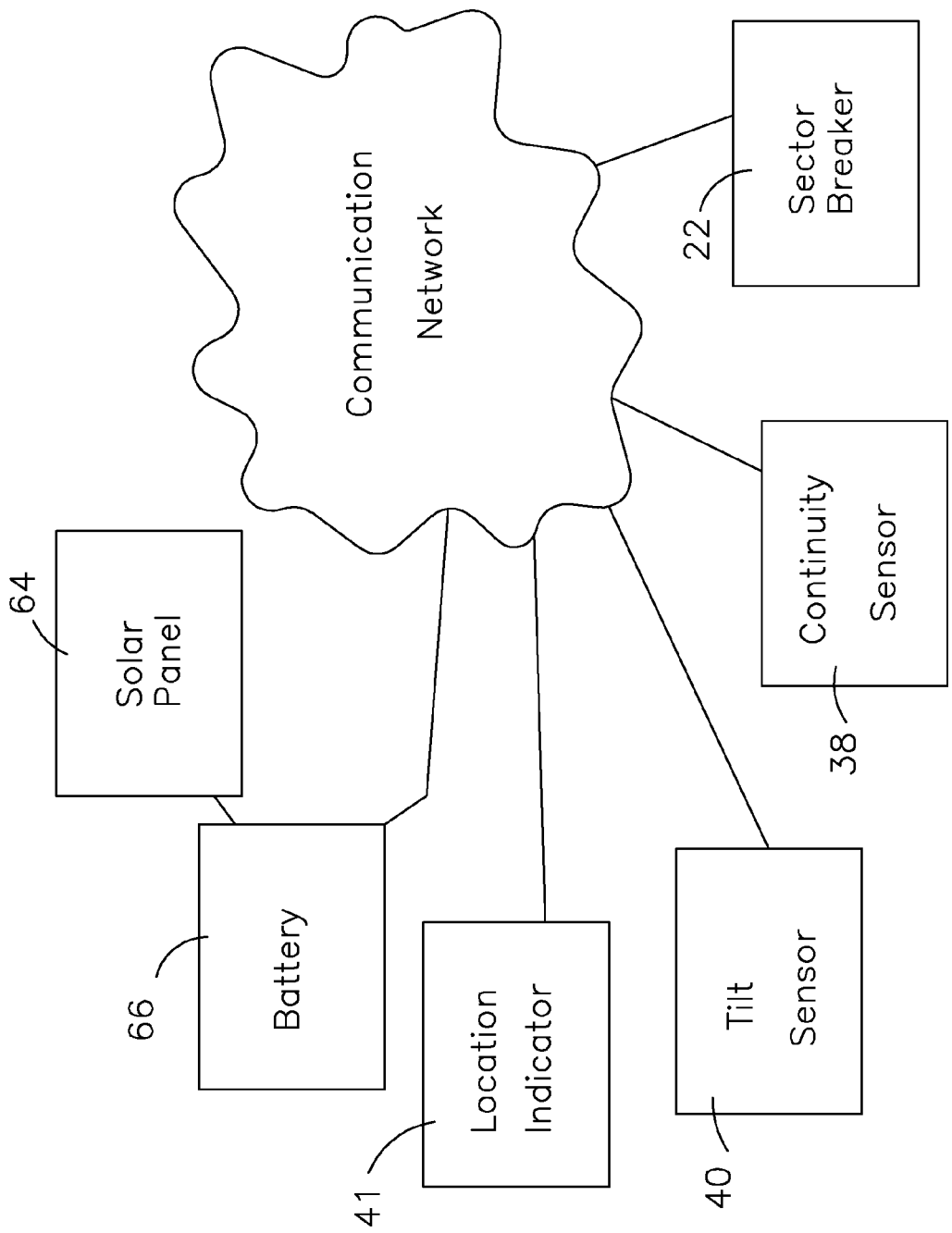
FIG. 6 is a block diagram of a communication system and sensors in accordance with one embodiment of the invention.

FIG. 6 is a block diagram of a communication system 20 and sensors in accordance with one embodiment of the invention. The communication system 20 may be powered by a solar panel 64 connected to a battery or bank of batteries 66. The communication network 20 connects the tilt sensor 40 and continuity sensor 38 to the sector breaker 22. A location indicator 41 is connected to the communication network 20. The location indicator 41 in one embodiment is associated with the continuity sensor 38. The location indicator 41 may be a simple code that indicates which utility pole 12 the continuity sensor 38 is located on. A location indicator 41 may also be associated with the tilt sensor. In another embodiment, the location indicator is a GPS receiver that transfers location information when a continuity sensor or tilt sensor indicates a fault condition.

In operation when an event such a storm results in a load that may damage the utility pole 12 or the electrical power lines 14 the force sensor 44 of the controlled release mechanism 16 releases the winch 42. This allows the cross bar 24 to slowly fall to the ground, because of the centrifugal brake 46. This controlled lowering protects the utility pole 12, cross bar 24, and power lines 14. The continuity sensor 38 alerts the sector breaker 22 that a power line is coming down and disconnects the power to line 14. Once the threat from the event is over the utility workers just use the winch drive connector 48 to raise the cross bar 24 and electrical power lines 14. Once all the cross bars 24 and power lines 14 are raised the sector switch 22 can be closed. In another embodiment, when the tilt sensor 40 senses too large an angle in the cross bar 24, the sector switch 22 is opened. The tilt switch 40 detects landslides and other problems that might cause a utility pole to lean over.

Figure 7:
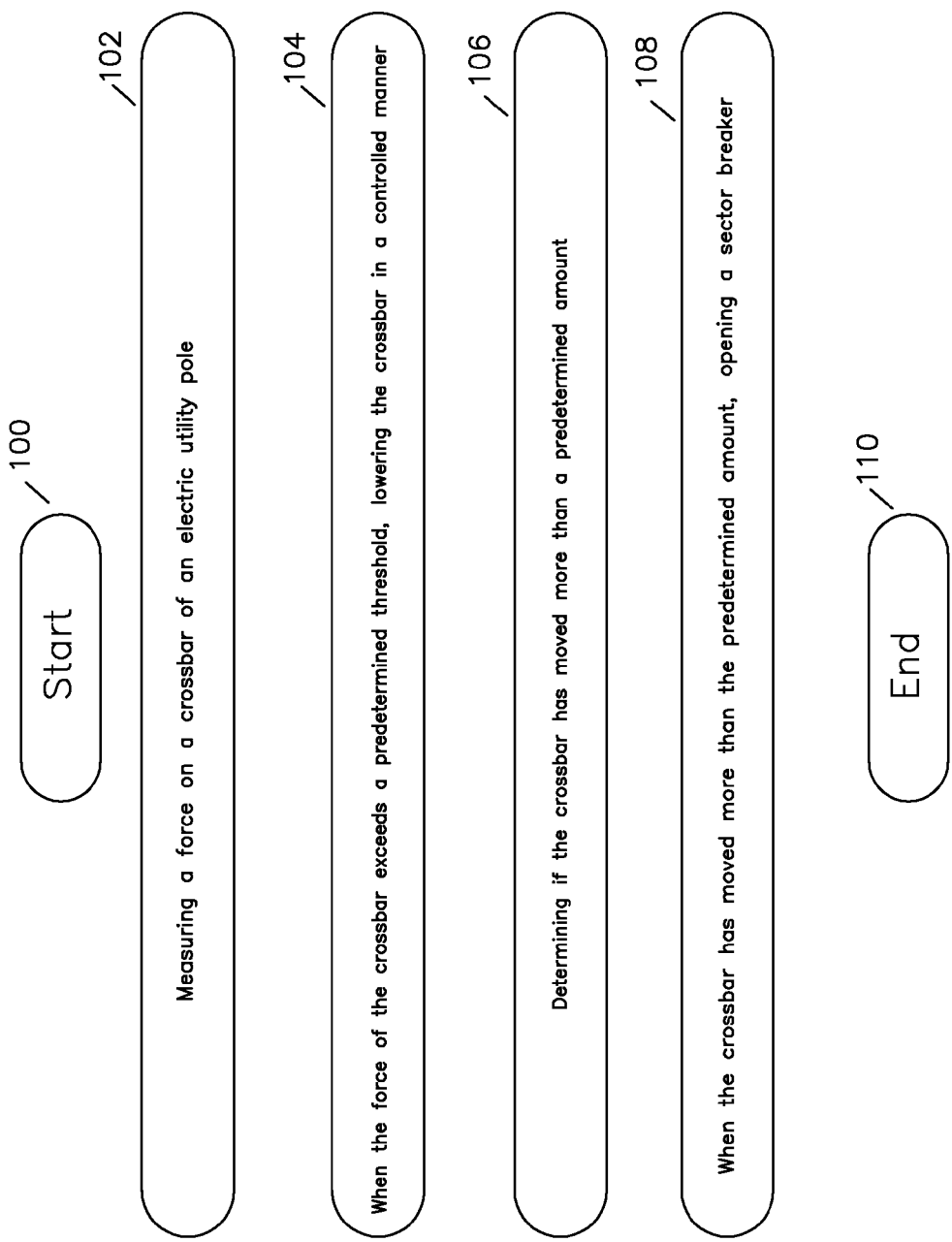
FIG. 7 is a flow chart of the steps used in a method of operating a power line system in accordance with one embodiment of the invention.

FIG. 7 is a flow chart of the steps used in a method of operating a power line system in accordance with one embodiment of the invention. The process starts, step 100, by measuring a force on a cross bar of an electrical utility pole at step 102. When the force on the cross bar exceeds a predetermined threshold, the cross bar is lowered in a controlled manner at step 104. Next, it is determined if the cross bar has moved more than a predetermined amount at step 106. When the cross bar has moved more than a predetermined amount at step 108, the sector switch is open, which ends the process at step 110.

Thus there has been described a system that protects electrical power lines and makes it easy to restore power after a storm or other event.

Note that the present invention has been described with respect to electrical utility poles however it should be apparent to those skilled in the art that it applies equally to utility towers or any overhead electrical power line system.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A power line system, comprising:
   a plurality of controlled release mechanisms;
   a plurality of telephone poles having a cross bar, each of the plurality of controlled release mechanisms attached to the plurality of telephone poles;
   a plurality of sensors attached to the plurality of controlled release mechanisms;
   a communication system electrically connected to the plurality of sensors; and
   a sector breaker electrically connected to the communication system;
   wherein the controlled release mechanism includes a dock yoke;
   wherein the controlled release mechanism includes a centrifugal brake;
   wherein the controller release mechanism includes a strain relief mechanism;
   wherein the sector breaker has a dielectric cap.

2. The power line system of claim 1, wherein the plurality of sensors includes a continuity sensor.

3. The power line system of claim 2, wherein the sector breaker is a normally open switch.

4. The power line system of claim 1, wherein the sector breaker includes an electromagnetic sear.

5. A method of operating a power line system, comprising the steps of:
   measuring a force on a crossbar of an electrical utility pole;
   when the force on the crossbar exceeds a predetermined threshold, lowering the crossbar in a controlled manner;
   determining if the crossbar has moved more than a predetermined amount; and
   when the crossbar has moved more than the predetermined amount, opening a sector switch;
   wherein the step of when the cross bar has moved more than the predetermined amount includes the step of measuring a tilt.

6. The method of claim 5, wherein the step of when the cross bar has moved more than the predetermined amount includes the step of measuring a continuity.

7. The method of claim 5, further including the steps of:
   determining if a threat has passed;
   when the threat has passed reeling the cross bar up the electric utility pole.

8. The method of claim 7, further including the step of when the cross bar is reeled up the electric utility pole, closing the sector switch.

\* \* \* \* \*